Patented Aug. 8, 1939

2,168,657

UNITED STATES PATENT OFFICE 2,168,657

MEDICINAL PREPARATION

Oscar A. Strauss, Milwaukee, Wis.

No Drawing. Application April 22, 1937,
Serial No. 138,369

4 Claims. (Cl. 167—70)

This invention relates to improvements in medical compounds. This application is a continuation in part of my application Serial No. 123,489 filed February 1, 1937.

It is the primary object of the present invention to provide a medicinal preparation which may be injected intravenously or intramuscularly into human patients for the correction of disturbances of the circulatory system.

The preparation consists of colloidal iodine and sodium cacodylate in solution in distilled water or in a normal salt solution. The strength of the iodine ingredient is not critical and neither is the strength of the sodium cacodylate ingredient critical. The proportions which have been found most satisfactory, however, are as follows.

I prefer to employ a 10 c. c. injection made up freshly of 9 c. c. of 0.2% solution of colloidal iodine in distilled water or normal salt solution and 1 c. c. of distilled water or normal salt solution in which 7 grains of powdered or crystallized sodium cacodylate have been dissolved. The two solutions may be sealed in separate ampules from which they are preferably drawn into the same syringe for use in a single injection. They may be injected consecutively, but the results are not as dependable and I have found that the desired result is not secured if much time elapses between the injection of the ingredients.

It is important that the iodine be in true colloidal form. It is also important that the sodium cacodylate be unoxidized. In using ingredients procured from certain domestic sources I have had occasional unfavorable reactions in the patient, but where the ingredients are entirely pure and fresh and in accordance with the aforesaid standards, I have had no unfavorable reactions whatever and have had uniformly excellent results in the treatment of angina pectoris, coronary diseases, and other disorders of the circulatory system.

I am aware that sodium cacodylate, and even preparations of iodine, have been used separately for treatment of the same types of disorders, but over a long period it has been my experience that such treatments are merely palliatives and do not correct the condition.

To accelerate the treatment, and also to assure permanence of result, I prefer to add to the injection as above specified a minute quantity of hydrastinine, which may be added either in crystalline form or in the form of an extract, fluid extract, tincture, or infusion. Hydrastinine is the active element in hydrastis, hydrastin and hydrastina, any of which may be substituted to give a like amount of the hydrastinine ingredient.

The dosage used is preferably on the order of $\frac{1}{150}$ of a grain of the crystalline hydrastinine hydrochloride, dissolved in the solution aforesaid. In my experience it seems undesirable to use more than $\frac{1}{2}$ grain at the maximum, and I have not found less than $\frac{1}{200}$ of a grain to be of any substantial effect. These amounts are given only by way of example and not with the idea of limiting the appended claims.

I claim:

1. A preparation for the treatment of disturbances of the circulatory system, comprising a mixture of colloidal iodine with sodium cacodylate.

2. A preparation for the treatment of disturbances of the circulatory system, comprising colloidal iodine and sodium cacodylate in aqueous solution for injection.

3. A preparation for the treatment of disturbances of the circulatory system which comprises approximately nine parts of colloidal iodine in a 0.2% solution and approximately one part of an aqueous solution containing approximately seven grains of sodium cacodylate.

4. A preparation for the treatment of disturbances of the circulatory system which comprises approximately nine parts of colloidal iodine in a 0.2% solution and approximately one part of an aqueous solution containing approximately seven grains of sodium cacodylate, the ingredients of said solutions being pure and the sodium cacodylate being unoxidized, and the said solution being freshly commingled at the time of injection.

OSCAR A. STRAUSS.